US008581696B2

(12) United States Patent
Ghabra et al.

(10) Patent No.: US 8,581,696 B2
(45) Date of Patent: Nov. 12, 2013

(54) UNIVERSAL GARAGE DOOR OPENER AND APPLIANCE CONTROL SYSTEM

(75) Inventors: Riad Ghabra, Dearborn Heights, MI (US); Jason T. Summerford, Novi, MI (US)

(73) Assignee: Lear Corporation, Southfield, MI (US)

( * ) Notice: Subject to any disclaimer, the term of this patent is extended or adjusted under 35 U.S.C. 154(b) by 380 days.

(21) Appl. No.: 12/861,018

(22) Filed: Aug. 23, 2010

(65) Prior Publication Data

US 2011/0169604 A1 Jul. 14, 2011

Related U.S. Application Data

(60) Provisional application No. 61/294,936, filed on Jan. 14, 2010.

(51) Int. Cl.
*G05B 19/00* (2006.01)
*B60R 25/10* (2013.01)

(52) U.S. Cl.
USPC .................................... 340/5.71; 340/426.36

(58) Field of Classification Search
USPC .......................................... 340/5.71, 426.36
See application file for complete search history.

(56) References Cited

U.S. PATENT DOCUMENTS

| | | | | |
|---|---|---|---|---|
| 6,525,645 | B2 | 2/2003 | King et al. | |
| 6,724,322 | B2 * | 4/2004 | Tang et al. | 340/989 |
| 7,215,238 | B2 * | 5/2007 | Buck et al. | 340/5.23 |
| 8,164,421 | B2 * | 4/2012 | McCall et al. | 340/7.62 |
| 2005/0024185 | A1 * | 2/2005 | Chuey | 340/5.71 |
| 2006/0202815 | A1 * | 9/2006 | John | 340/531 |
| 2006/0238297 | A1 | 10/2006 | Tang et al. | |
| 2007/0216516 | A1 * | 9/2007 | Ghabra et al. | 340/5.64 |
| 2008/0197987 | A1 * | 8/2008 | King et al. | 340/426.36 |
| 2008/0291047 | A1 * | 11/2008 | Summerford et al. | 340/825.69 |
| 2009/0096596 | A1 | 4/2009 | Sultan et al. | |
| 2009/0160637 | A1 * | 6/2009 | Maeng | 340/539.1 |
| 2009/0243821 | A1 * | 10/2009 | Tieman et al. | 340/426.36 |
| 2009/0322475 | A1 * | 12/2009 | Uno et al. | 340/5.64 |

* cited by examiner

*Primary Examiner* — Benjamin C Lee
*Assistant Examiner* — Adam Carlson
(74) *Attorney, Agent, or Firm* — Brooks Kushman P.C.

(57) ABSTRACT

Universal garage door opener and appliance control system operable to facilitate garage door opener and appliance control with a fob or other wireless device operable to wirelessly communicate corresponding instructions to a vehicle other device for subsequent relay to the garage door opener or controlled appliance.

16 Claims, 2 Drawing Sheets

UNIVERSAL GARAGE DOOR OPENER AND APPLIANCE CONTROL SYSTEM

CROSS-REFERENCE TO RELATED APPLICATIONS

This application claims the benefit of U.S. provisional Application No. 61/294,936 filed Jan. 14, 2010. The disclosure of which is incorporated in its entirety by reference herein.

This application relates to U.S. Ser. No. 11/751,746 filed May 22, 2007.

TECHNICAL FIELD

The present invention relates to universal garage door openers and appliance control systems, such as but not limited to systems of the type that may be incorporated into a vehicle or otherwise cooperate with the operation thereof.

BACKGROUND

Home appliances, such as garage door openers, security gates, home alarms, lighting, and the like, may conveniently be operated from a remote control. In some cases, the remote control may be purchased together with the appliance. The remote control transmits a radio frequency activation signal which is recognized by a receiver associated with the appliance, such as for use in controlling the operation thereof. Aftermarket remote controls are gaining in popularity as such devices can offer functionality different from the original equipment's remote control. Such functionality includes decreased size, multiple appliance interoperability, increased performance, and the like. Aftermarket controllers are also purchased to replace lost or damaged controllers or to simply provide another remote control for accessing the appliance.

An example application for aftermarket remote controls are remote garage door openers integrated into an automotive vehicle. These integrated remote controls provide customer convenience, appliance interoperability, increased safety, and enhanced vehicle value. One problem with such devices is the potential of one remote control being used without regard to the use of another remote control, which for example, can be problematic in the event one person attempts to control the application with the remote control purchased with the application while another person attempts to control the application with the remote control integrated into the vehicle. This could lead to a scenario where one remote control operator thwarts a previously executed operation of the other remote control operator simply from being unaware of the other's intentions.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

Figure 1:
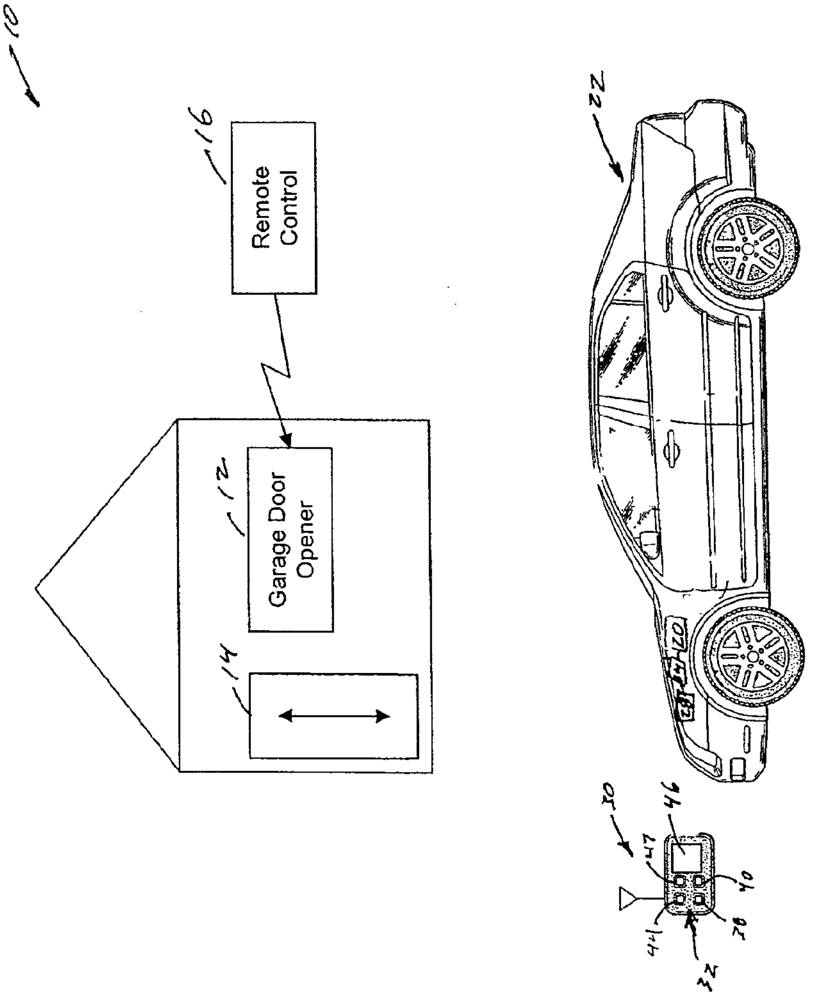
FIG. 1 illustrates an appliance system in accordance with one non-limiting aspect of the present invention.

FIG. 1 illustrates an appliance system 10 in accordance with one non-limiting aspect of the present invention. The present invention contemplates wirelessly controlling any number of appliances and types of appliances, such as but not limited to home appliances, and for exemplary purposes, is predominately described with respect to the wirelessly controlled appliance being a garage door opener 12. The garage door opener 12 may be operable to actuate a garage door 14 in an up and down manner, or otherwise between opened and closed position, or some position therebetween, such as to control access to a home garage. The wireless control is shown to be facilitated with wireless signals sourced from a remote control 16 purchased with the garage door opener 12 and a vehicle-based garage door opener system 20.

The vehicle-based garage door opener system 20 may include a transmitter (not shown) operable to transmit wireless garage door signals to the garage door opener 12 to controller the operation thereof. The garage door system 20 may include a number of buttons, a touch screen, or other user interface (not shown) within a vehicle 22 to facilitate generating the garage door control signals according to user inputs thereto. In this manner, for example, a user positioned within the vehicle 22 or within reach of the related buttons, may be able to control one or more garage door related events, such as opening and closing the garage door 14. The vehicle-based garage door system 20 may be programmed with or otherwise operable to learn a code or other messaging requirement of the garage door opener 12 in order to facilitate proper transmission of the garage door signals.

A remote keyless entry (RKE) system 28 may be included within the vehicle 22 to facilitate remote entry and other keyless related operations. The keyless operations associated therewith may be facilitate with an RKE transceiver (not shown) operable to support two-way communication of RKE signals with an RKE fob or other portable, wireless device 30. The RKE fob 30 may include RKE push-buttons 32 that may be selectively activated by an operator to generate a RKE demand signal for locking or unlocking vehicle doors, opening or closing a vehicle sliding door, unlocking a vehicle trunk, activating internal and/or external vehicle lights, activating a "panic" alarm, and/or performing a variety of other vehicle related functions. It should be noted that while the present invention has been described herein as implementing push-buttons, any appropriate man-machine interface device (e.g., touch screen, switch, and the like) may be implemented to meet the design criteria of a particular application.

A vehicle bus 34 may be included to facilitate message exchanges between the RKE system 28, garage door opener system 20, and other vehicle subsystems (not shown), such as but not limited to vehicle subsystems that must be controlled to instigate the RKE related functions noted above and/or to perform passive entry or other functions according to information transmitted from the fob 30. The RKE system 28 may include a controller (not shown) operable to translate RKE signals or other signals received from the RKE fob 30 for transmission over the vehicle bus 34 to the garage door system 20. These garage door signals may be translated or formatted into control signals sufficient to direct operation of the garage door system 20 to issue corresponding control signals to the garage door opener 12 or other appliance within the control thereof. In this manner, the RKE fob 30 may be able to direct control of the garage door system 20 with signals interface thereto by way of the RKE system 28 and the vehicle bus 34.

The RKE fob 30 is shown to include a lock button 38, an unlock button 40, a trunk button 42, a panic button 44, and a display 46. Each button 38, 40, 42, 44 may be actuated with depression or other contact sufficient to instigate transmission of a related wireless RKE signal to the vehicle-based RKE system 28, which may vary depending on the particular RKE button 38, 40, 42, 44 being actuated and the way in which is being activated (e.g., press and release, press and hold, rapid depression, or some other sequencing). The RKE fob 30 may be limited in its communication capabilities such that it may be unable to process or otherwise detect transmission of the garage door signals emitted by the garage door system 20. The display 46 may be operable with signals received from the RKE system 28 to display information related to RKE functions, global positioning, etc. The display 46 or an alert unit (not shown) may be used to provide audible and/or visual alerts to a fob user.

One non-limiting aspect of the present invention contemplates relying on the alerts to notify operators of related garage door opener controls. The alerts may be used to indicate a status of the garage door opener 12 and/or the status of the last, wireless requested control of the garage door opener 12. In the case of the last control originating from the vehicle-based garage door opener system 20, the alert may be generated by the vehicle-based RKE system 28 transmitting RKE signals to the RKE fob 30 to notify the fob 30 of a successful or unsuccessful transmission of a relate garage door control signal to the garage door opener 12. A successful transmission may occur in the event the signal required to implement the related control is transmitted from the vehicle-based garage door system 20. An unsuccessful transmission may occur in the event the RKE system 28 fails to receive confirmation or acknowledgment from the garage door opener system 20 that the requested control was transmitted.

One non-limiting aspect of the present invention contemplates the vehicle-based garage door opener system 20 being limited in its wireless transmission capabilities such that it is only able to transmit garage door signals, and not receive them. Of course the present invention is not necessarily intended to be so limited and fully contemplates the vehicle-based garage door system 20 including capabilities to receive garage door signals from the remote control 16 and/or the garage door opener 12. The ability to receive signals may be used, for example, to confirm whether a requested garage door control operation was successfully or unsuccessfully completed, i.e., the garage door opener 12 may be operable to transmit confirmation or acknowledgment messages to be used by the vehicle-based garage door system in indicating completion of the request garage door related operation.

Figure 2:
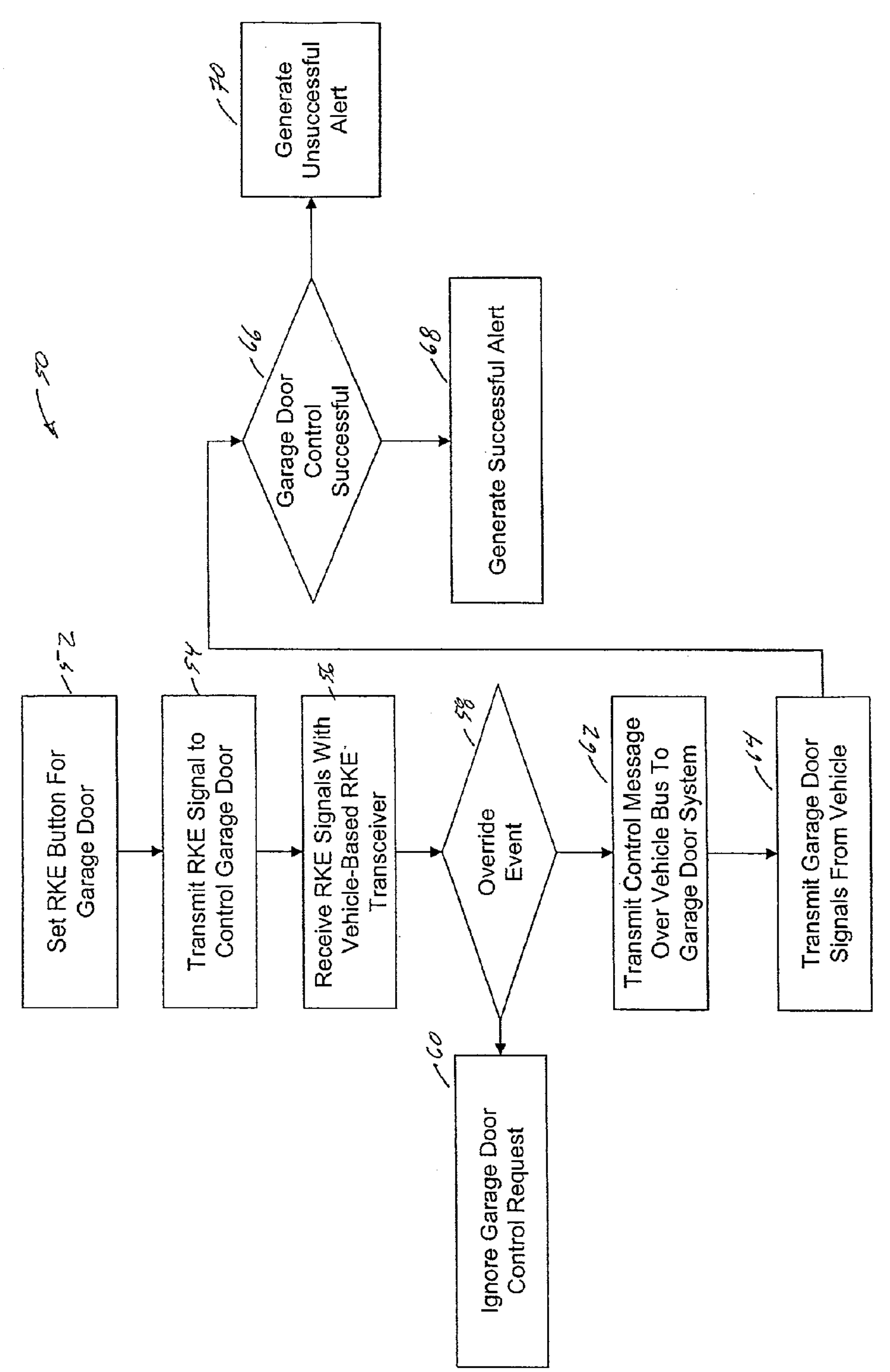
FIG. 2 illustrates a flowchart of an appliance control method in accordance with one non-limiting aspect of the present invention.

FIG. 2 illustrates a flowchart 50 of an appliance control method in accordance with one non-limiting aspect of the present invention. The method may be embodied in a computer-readable medium or other medium suitable for storing code or other executable programming adaptable for use within one more or more of the elements shown in FIG. 1 or otherwise sufficiently operable to support execution of the operations necessary to implement the methods contemplated by the present invention. For exemplary purposes, the method is predominantly described with respect to controlling operation of a garage door opener. This is done without intending to unnecessary limit the scope of the invention since the present invention fully contemplates its use in controlling other types of application and not just garage door openers.

Block 52 relates to setting one of the RKE buttons 32 to support garage door opener related control. This may be done prior to use of the RKE fob 30, such as if the RKE fob 30 already includes one or more garage door buttons, or thereafter in the event the fob 30 does not include a dedicated garage door opener button, such as by assigning garage door related controls to one or more of the existing RKE buttons 32. One non-limiting aspect of the present invention contemplates a learning process where the RKE fob 30 is programmed to generate an RKE signal specific to instructing actuation of the garage door when the unlock button 40 is contacted for a sufficient period of time or a particular sequence of buttons 32 are actuated. The period of time may be selected to be greater than a period time typically used to contact the unlock button 40 when unlock of a vehicle door is desired. In this manner, and since the RKE fob 30 may be unable to directly transmit the garage door control signals to the vehicle-based garage door system 20, the RKE fob 30 may rely on RKE signals to instigate garage door related controls.

Block 54 relates to the RKE fob transmitting an RKE signal to direct control of the vehicle-based garage door system 20, such as by pressing and holding the unlock button or other button(s) set previously. Block 56 relates to the RKE transceiver included within the vehicle 22 receiving the RKE signal from the RKE fob 30 and decoding the received signals to instigate a related control of the garage door opener 12. Block 58 relates to checking for an override event prior to implementing the control requested in Block 54. The override event may include evaluating whether the fob is authorized to implement the requested control, the proximity of the fob to the vehicle (e.g. if the fob is within the vehicle, an override may be desired to prevent inadvertent control), etc.

Block 60 relates to ignoring or otherwise dismissing the requested control in the event an override even is detected. Block 62 relates to transmitting a message over the vehicle bus 34 from the RKE system 28 to the garage door system 20 in the event no override event is determined. The message may be generated by the RKE controller translating the RKE signals received from the RKE fob 30 into signals sufficient to direct or otherwise instigate control of the garage door opener system 20. Block 64 relates to the vehicle-based garage door opener system wirelessly transmitting garage door opener control signals to control the garage door opener 12 to implement a related control.

Block 66 relates to assessing whether execution of the requested garage door opener control was successful or unsuccessful and implementing a corresponding alert in Blocks 68, 70. The alerts may be generated on the RKE fob 30 in response to RKE signals transmitted from the vehicle-based RKE system 28, which in turn may receive instructions or other notifications from the vehicle-based garage door opener system 20 regarding the success or failure of the desired garage door opener control.

Optionally, a status of the garage door opener 12, e.g., opened, closed, or partially opened, may be communicated as one of the alerts, which may be determined based on a last known, successful control and/or from signals communicated from the garage door opener 12. A user may be able to review the status on the display 46 to assess whether the desired control was implemented. This can be helpful in the event the user is unable to view the garage door 14, such as if the user attempts to control the garage door from within the home, if the vehicle 22 is beyond its wireless transmission range and is unable to communicate with the garage door opener or in the event the remote control 16 independently controlled the garage door 12 as such control can be relayed to the fob 30.

As supported above, one non-limiting aspect of the present invention relates to controlling any number of remotely controllably systems, such as but not limited to a universal garage door opener and appliance control system disclosed in U.S. Pat. No. 7,039,397, entitled User-Assisted Programmable Appliance control, the disclosure of which is hereby incorporated in its entirety. One non-limiting aspect of the present invention relates to the use of a key fob to facilitate control of a universal garage door opener (UGDO) unit. The UGDO unit may be included in a vehicle to control a garage door (not show) or other device within a wireless communication range of the vehicle. The UGDO unit may include an antenna to facilitate the contemplated wireless communication and control of the garage door and/or the UGDO unit may rely on another antenna included within the vehicle, such as but not limited to a remote keyless entry (RKE) or passive entry (PE) antenna (not shown).

One non-limiting aspect of the present invention relates to a vehicle including a two-way transceiver to facilitate two-way, wireless communications with the key fob. These communications may be used to control any number of vehicle systems and to perform any number of other operations commonly associated with the RKE, PE, and other key fob based control systems. The key fob may include buttons assigned to each of unlock, lock, trunk, and panic control operations. Of course, the present invention is not intended to be so limited and fully contemplates the fob included more or less buttons/displays, and particularly a button dedicate to control of the garage door/appliance(s). In accordance with one non-limiting aspect of the present invention the communication link between the UGDO unit and the fob may be used to facilitate activating garage door opening without requiring the user to enter the vehicle.

Optionally, UGDO related operations may be activated via 2-way fob capabilities to operate a garage door rather than having to first unlock the vehicle to gain access to the UGDO unit such that convenience may be provided by allowing the use of the fob to operate the garage door rather than restricting this operation to only the UGDO or opener unit included within the vehicle. The present invention may also enhance security by allowing UGDO function only if vehicle is authorized (via fob or key based authentication procedure). For added convenience and security, the 2-way fob can also show the status of the last signal transmitted of the UGDO unit to confirm that a garage door lock signal was sent. As a cost reduction concept, the transmitter portion of the 2-way transceiver may be used to transmit the UGDO related functional information and data, such as by replacing an entire UGDO RF circuit.

While the remote transmission to the UGDO unit in the vehicle are shown and described above as being sourced from the key fob, the present invention is not intended to be so limited and fully contemplates the use of other device to facilitate similar communications or other communications suitable to the operations contemplated by the present invention, such as but no limited to a handheld unit, like a cell phone or PDA, replacing the role of the fob. The UGDO functional, whether triggered by the fob or one of other noted devices, may be coordinated with the buttons already existing on those devices, such as by requiring certain button sequences and hold time in order to implement UGDO functions instead of the functions otherwise indicated on the buttons.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A garage door opener (GDO) system operable with a vehicle to transmit garage door signals to control a garage door, the system comprising:

a remote keyless entry (RKE) fob being operable remotely from the vehicle to transmit and receive RKE signals;

a RKE transceiver being fixed within the vehicle and operable to transmit and receive RKE signals, and upon receipt of RKE signals from the RKE fob, to control one or more vehicle subsystems as a function thereof; a GDO transmitter being fixed within the vehicle and operable to transmit the garage door signal to control the garage door in response to receipt of a corresponding GDO signal; and wherein the RKE transceiver and the GDO transmitter are operably coupled to each other via a vehicle bus, the RKE transceiver being further operable to determine, independently of operation of the RKE fob, the GDO transmitter to have transmitted the garage door signal from information output by the GDO transmitter on the vehicle bus;

wherein the RKE transceiver is operable to transmit RKE signals to the RKE fob to notify the RKE fob of the GDO transmitter transmitting the garage door signal responsive to the RKE transceiver determining that the GDO transmitter has transmitted the garage door signal;

wherein the RKE fob is operable to generate an alert in response to receipt of the RKE signals notifying the RKE fob of the GDO transmitter transmitting the garage door signal.

2. The system of claim 1 wherein the alert is an audible alert.

3. The system of claim 1 wherein the alert is a visual alert.

4. The system of claim 1 wherein the GDO transmitter receives the GDO signal over the vehicle bus.

5. The system of claim 4 wherein the GDO transmitter is operably coupled to a user operable GDO interface within the vehicle for receiving the GDO signal over the vehicle bus from the GDO interface.

6. The system of claim 4 wherein the RKE transceiver is further operable to transmit the GDO signal to the GDO transmitter over the vehicle bus.

7. The system of claim 6 wherein the RKE fob is further operable to transmit RKE signals to the RKE transceiver to instruct the RKE transceiver to transmit the GDO signal to the GDO transmitter over the vehicle bus.

8. The system of claim 7 wherein the RKE transceiver is further operable to instruct delivery of the GDO signal to the GDO transmitter while the vehicle is locked.

9. The system of claim 7 wherein the RKE fob is further operable to transmit the RKE signals to the RKE transceiver to instruct the RKE transceiver to transmit the GDO signal in response to at least one of user depression of a button included on the RKE fob that displays an icon representative of a door, user depression of a button included on the RKE fob that displays an icon representative of an RKE function, user depression of a particular sequence of buttons included on the RKE fob, and user depression of a button of included on the RKE fob for a period of time of at least 0.5 seconds.

10. The system of claim 7 wherein the RKE transceiver is further operable to ignore RKE fob instructed transmission of the GDO signal in the event one of the RKE transceiver determines the RKE fob to be within the vehicle and the RKE transceiver fails to authenticate the RKE fob.

11. The system of claim 1 wherein the RKE fob is unable to detect transmission of the garage door signal.

12. The system of claim 1 wherein the GDO transmitter is unable to receive signals directly from the RKE fob.

13. A portable, wireless device operable with a vehicle-based keyless entry system and a garage door opener (GDO) system, the keyless entry system being operable to support keyless entry to the vehicle and the GDO system onboard a vehicle being operable to control a garage door using wireless signals transmitted from the vehicle, the wireless device comprising:

an antenna being operable to support two-way wireless communications with the keyless entry system;

a controller being operable to wirelessly instruct the keyless entry system to instruct the GDO system to control the garage door; and an alert unit being operable to generate an alert in response to the antenna receiving wireless signals from the keyless entry system notifying the controller that the GDO system is controlling the garage door responsive to the keyless entry system determining that the GDO system is controlling the garage door in response to being instructed by the keyless entry system to control the garage door and responsive to the keyless entry system determining that the GDO system is controlling the garage door independently of the controller instructing the keyless entry system to instruct the GDO system to control the garage door.

14. The wireless device of claim 13 wherein the alert unit is instructed by the controller to generate a first alert when control of the garage door is instigated, a second alert in the event control of the garage door is successful, and a third alert in the event control of the garage door is unsuccessful.

15. The wireless device of claim 14 wherein the controller is further operable to determine control of the garage door to be instigated, successful, and unsuccessful from wireless signals received from the keyless entry system.

16. The wireless device of claim 13 further comprising at least one user operable unlock button wherein the controller is further operable to wirelessly instruct the keyless entry system (i) to unlock the vehicle in the event the unlock button is contacted for a first period of time and (ii) to instruct the GDO system to control the garage door, instead of unlocking the vehicle, in the event the button is contacted for a second period of time, the second period of time being greater than the first period of time.

* * * * *